(No Model.) 3 Sheets—Sheet 1.
C. A. ANDERSSON.
AUTOMATIC RECORDER FOR CARRIAGE SEATS.
No. 414,963. Patented Nov. 12, 1889.
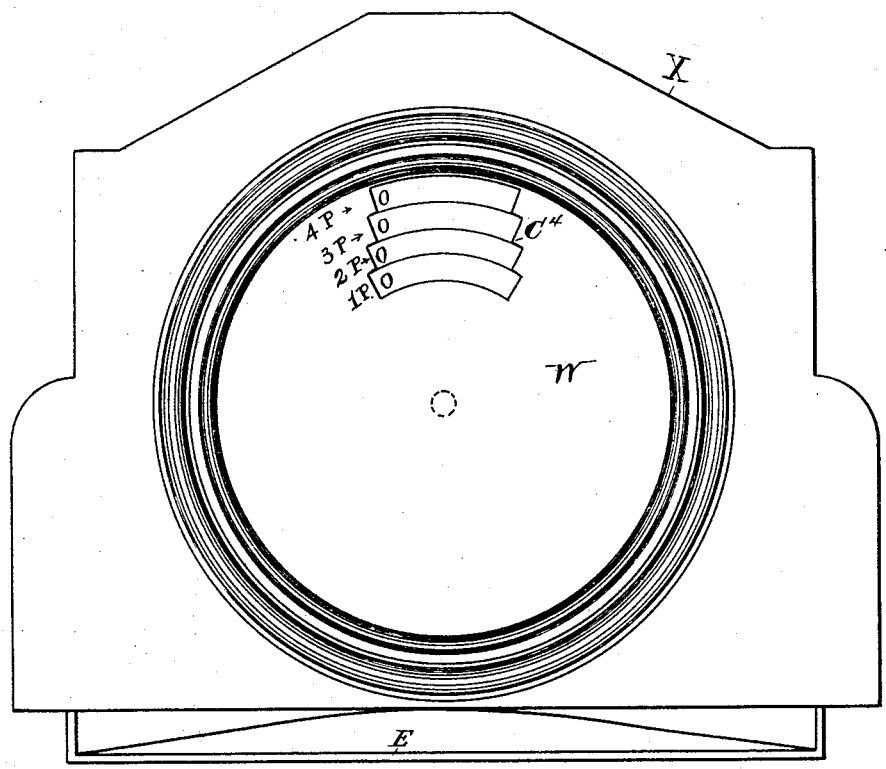
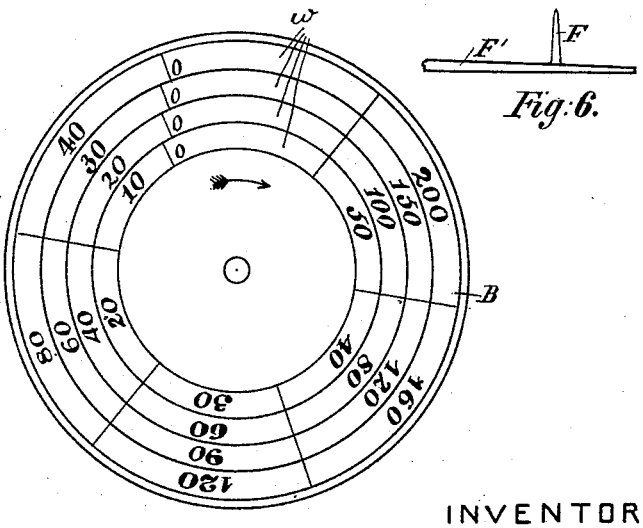
WITNESSES:
INVENTOR:

(No Model.) 3 Sheets—Sheet 2.
C. A. ANDERSSON.
AUTOMATIC RECORDER FOR CARRIAGE SEATS.

No. 414,963. Patented Nov. 12, 1889.

WITNESSES

INVENTOR:
Carl A. Andersson
by Henry Connett
Atty.

(No Model.) 3 Sheets—Sheet 3.

C. A. ANDERSSON.
AUTOMATIC RECORDER FOR CARRIAGE SEATS.

No. 414,963. Patented Nov. 12, 1889.

WITNESSES:
E. B. Bolton

INVENTOR:
Carl A. Andersson
by Henry Connett
Atty.

UNITED STATES PATENT OFFICE.

CARL ADOLF ANDERSSON, OF STOCKHOLM, SWEDEN.

AUTOMATIC RECORDER FOR CARRIAGE-SEATS.

SPECIFICATION forming part of Letters Patent No. 414,963, dated November 12, 1889.

Application filed May 11, 1887. Serial No. 237,828. (No model.)

*To all whom it may concern:*

Be it known that I, CARL ADOLF ANDERSSON, a subject of the King of Sweden, and a resident of Stockholm, Sweden, have invented certain Improvements in Automatic Controlling Devices for Carriages, of which the following is a specification.

My invention relates to a recorder and indicator to be applied to carriages for the purpose of indicating the exact length of time the carriage has been occupied and how long each particular seat in the carriage has been occupied during the time the coachman or driver has had the carriage out or in commission. The apparatus or instrument also indicates automatically to the passenger or rider the sum or fare he must pay at the end of the ride.

My invention will be fully described hereinafter, and its novel features carefully defined in the claims.

Figure 2:
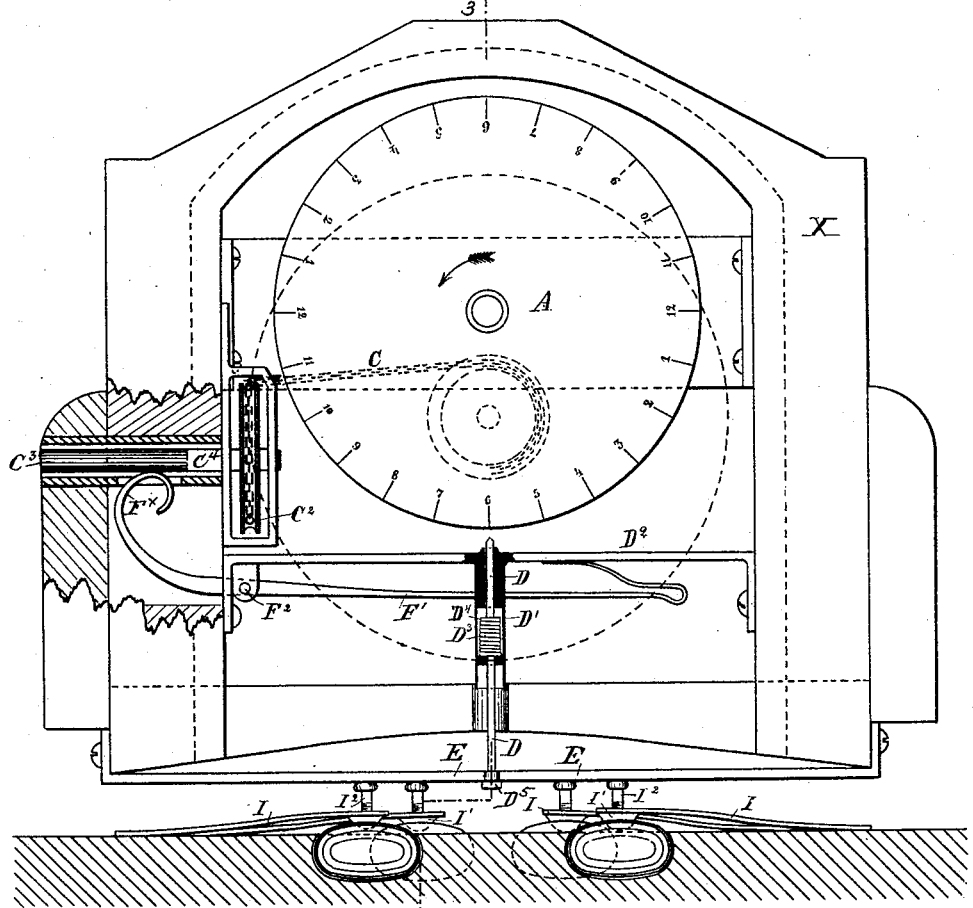
Figure 4:
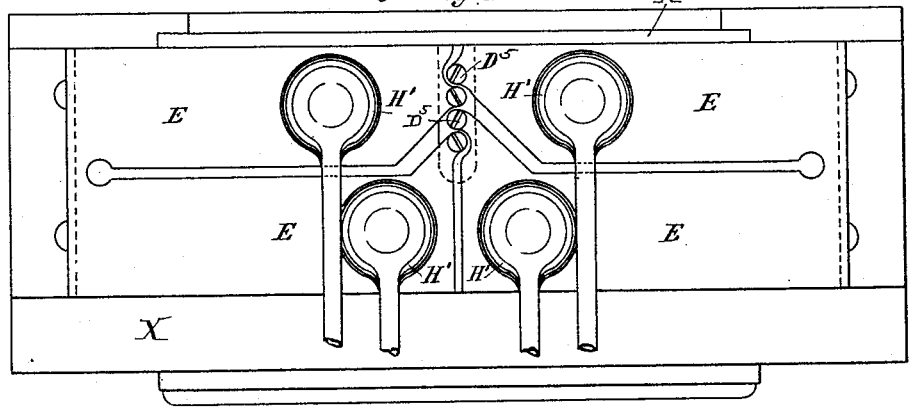
Figure 3:
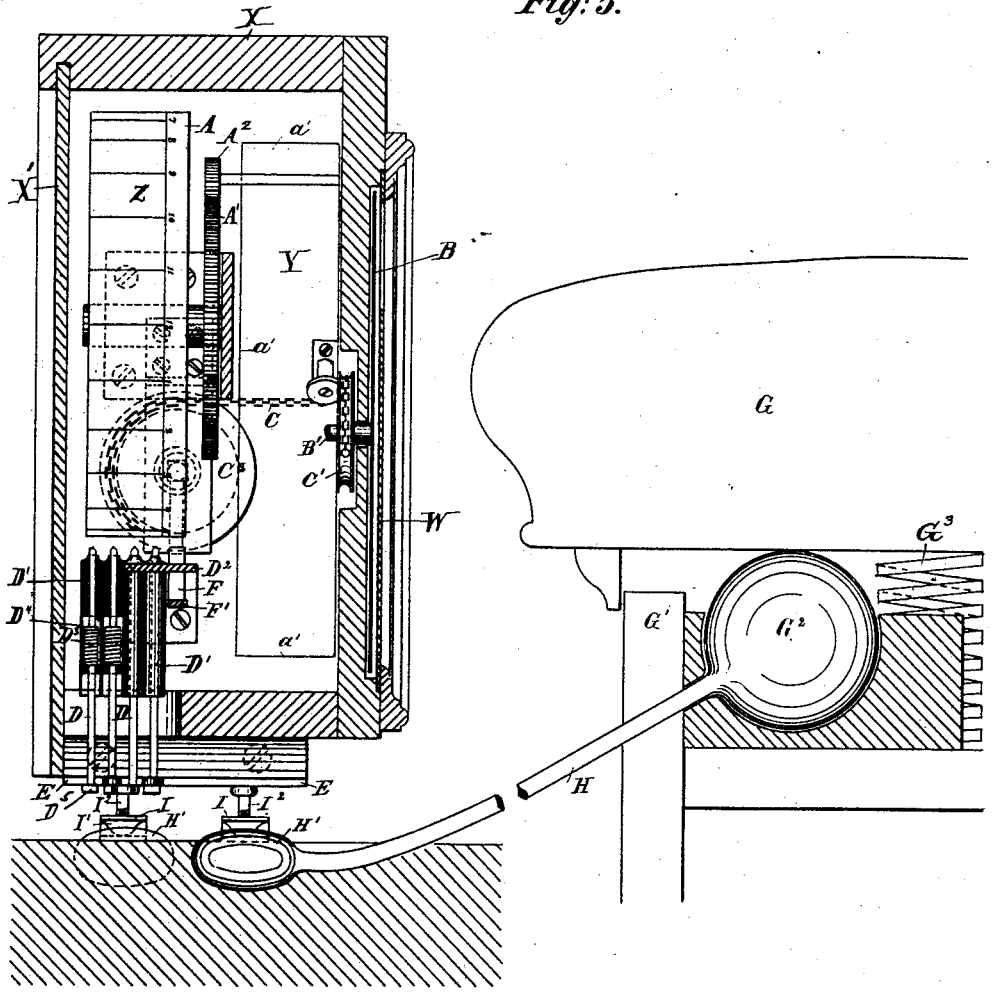
Figure 7:
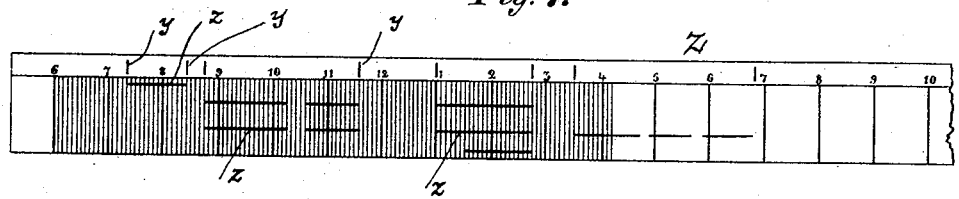

In the drawings which serve to illustrate my invention, Figure 1 is a front elevation of my apparatus. Fig. 2 is a rear elevation. In this view the apparatus is shown with the back plate or slide removed, so that the interior may be seen, and some of the parts are in section or broken away in order to better illustrate my invention. Fig. 3 is a vertical mid-section of the casing or box of the apparatus on line 3 3 in Fig. 2. This view shows the internal mechanism in edge or side elevation, and it also shows the application of the apparatus to the seat of a carriage. Fig. 4 is an under side or bottom view of the apparatus. Figs. 5, 6, and 7 illustrate details that will be hereinafter described.

In a casing X, of any kind, is mounted a spring clock mechanism Y. I have not shown the actual clock mechanism, as any of the ordinary clock machinery may be employed. The letters $a'$ $a'$ in Fig. 3 and the large dotted circle in Fig. 2 represent the boundaries of the space occupied by this clock mechanism, which need only run for twenty-four hours. This clock mechanism drives a drum A, mounted rotatively in the casing X, through the medium of a spur-wheel $A'$ on the axis of the drum and a pinion $A^2$, this latter deriving its proper motion from the clock-train in a well-known way. The drum A makes one revolution in twenty-four hours, and has marked on its rear face (seen in Fig. 2) the proper numerals and dial-graduations indicating the hours of the day and night. The drum A travels constantly in one direction, as indicated by the arrow thereon in Fig. 2.

In order to reach the interior of the casing X, it is provided with an opening in the back closed by a slide $X'$. (Seen in Figs. 3 and 4.)

Around the drum A is first wrapped a strip of transfer or manifold paper—such as is used in type-writing, for example—and over this is wrapped a strip of paper Z, (seen detached and stretched out in Fig. 7,) which has marked or printed on it graduation marks or lines signifying hours and fractions thereof.

In Fig. 7 the heavier numbered transverse lines represent hour-lines and the intermediate lines represent the subdivisions. In this case these represent each five minutes. These finer subdivisions are not shown on all the strip Z, nor is the whole of the strip shown in Fig. 7. The spaces between the hour-lines on the strip Z are the same as the spaces between the hour-marks on the drum A, and when the strip Z is applied on the drum these spaces on the two are made to register, as will be understood.

Under the drum A are arranged the pointed registering-pins D D, one for each seat in the carriage. In this case I have supposed the carriage to be four-seated, and there are consequently four pins. These pins are ranked, as seen in Fig. 3, directly under the strip Z on drum A, so that when they are pressed upward against said strip, in the manner to be described hereinafter, each will trace a separate mark or line thereon through the medium of the manifold paper under the strip.

All the pins D are mounted and provided alike, and a minute description of one will suffice. The pin D is mounted to slide up and down in a tubular casing $D'$. Two of these casings are seen in section in Fig. 3, and one in section in Fig. 2. The several casings $D'$ are or may be integrally formed, and they are mounted fixedly in a cross bar or plate $D^2$. In the casing $D'$ is a chamber, in which is a spiral spring $D^3$, coiled around the pin D and taking under a shoulder or collar $D^4$ thereon, so that it tends always to press the pointed end of the pin up against the strip Z on the drum. The lower ends of the pins D project down each through a hole in the free end of a leaf-spring E, secured to the bottom of the casing, (see Fig. 4,) and each has a head or nut $D^5$, which takes under spring E. Thus spring E, which is stronger than spring $D^3$, keeps the pin D drawn down and spring $D^3$ compressed normally; but if spring E be pressed upward then spring $D^3$ is free to act, and it presses the pin D upward until its point bears on the strip Z with the force due to the strength of spring $D^3$; but the collar $D^4$ on the pin strikes the roof of the chamber in casing $D'$, and thus prevents too great upward movement of the pin D. The object of this arrangement is to cause the pin D to press at all times gently and uniformly on the strip Z, no matter what may be the force applied to effect the recording or permit it to be made. It is only necessary, then, to employ some intermediate mechanism between the carriage-seat and the spring E, whereby, when a passenger is seated, said spring will be pressed upward against the strip on the slowly-moving drum A, and held there, in order to register by a longitudinal mark on the strip Z the length of time the seat has been so occupied. Various devices may be employed to effect this. The one I prefer is illustrated in Figs. 3 and 4, and will now be described.

G in Fig. 3 is the carriage-seat, which may be of any kind. It is supported on a slight spring or springs $G^3$, sufficient to hold it up, as seen in Fig. 3, when the seat is empty. When the passenger seats himself, the seat will be pressed down until it rests on the stop $G'$. Any kind of spring may be used, and it may be placed in the most convenient position.

Under seat G is a hollow rubber bulb or receptacle $G^2$, placed, preferably, in a recess, as seen in Fig. 3, so that it cannot get out of place nor expand much laterally. This bulb $G^2$ is provided with a tube H, which leads to another similar but flattened bulb $H'$ at the apparatus, which latter bulb rests in a recess directly below one of the springs E. These bulbs and their connecting-tube are filled with some liquid, preferably one that will not freeze readily. I prefer a saturated solution of chloride of calcium in water. The salt is dissolved in water heated from 20° to 25° Celsius.

Over the bulb $H'$ is placed the free end of a leaf-spring I, having a rounded protuberance $I'$, which presses on the bulb. Into spring I is inserted a screw $I^2$, the head of which takes under the spring E. This screw provides for the proper adjustment of the parts. Spring E keeps the protuberance $I'$ pressed down on the bulb.

When a passenger seats himself on seat G, he will, no matter what his weight may be, depress the seat to stop $G'$. The seat will compress bulb $G^2$, force part of the liquid therefrom through tube H into bulb $H'$, expand this bulb, press up the spring E, and thus permit spring $D^3$ to press up the pin D into contact with the strip Z. As the drum A is being constantly rotated by the clock mechanism, the point of pin D will produce a mark on strip Z—such as $z$ in Fig. 7—corresponding in length to the length of time the passenger has been seated. When he rises from his seat, the seat rises and compression is removed from bulb $G^2$. Spring E will then be free to return to its normal position, thus displacing the liquid in bulb $H'$ in part and restoring the normal status.

I will now describe another feature of the apparatus, referring especially to Figs. 1, 3, and 5.

B is a disk or dial, (seen detached in Fig. 5,) which is mounted frictionally on an arbor $B'$ of the clock mechanism Y, whereby said disk B is driven or rotated by said clock mechanism. This disk may make a revolution in every twenty-four hours. I usually fix the disk B to a sleeve and slip this sleeve on the clock-arbor in the same manner that some clock-hands are mounted. In front of disk B is a plate W, in which is an aperture $C^4$, (see Fig. 1,) through which aperture certain numerals on the disk may be seen. On the face of the disk are drawn as many concentric zones or bands $w$ as there are seats in the carriage, and on these zones are zero-marks, as seen in Fig. 5, and also numerals indicating the amount of the fare. For example, the numerals in the inner zone indicate the fare for one person, those in the next zone the fare for two persons, those in the third and fourth zones the fare for three and four persons, respectively. As the disk B rotates, the amounts seen at the aperture $C^4$ increase in direct proportion to the length of time traveled; and I may say here that it is not essential that the disk make but one revolution in twenty-four hours. It may make a revolution in six hours, for example, as a ride seldom lasts longer than this. The dial or disk B is shown in Fig. 5 as divided into six hour-divisions, and it is supposed to make one revolution in six hours. The numerals show the fare for five hours.

The disk B is frictionally mounted on its arbor, so that the driver may with a suitable key set it back to zero at the termination of each drive. This may be done through the medium of any suitable mechanism. The mechanism I employ comprises a sheave $C'$, fixed on the tubular shaft of disk B, a chain C, wound around said sheave and attached at one end thereto, and another sheave $C^2$, to which the other end of said chain is attached. The shaft on which sheave $C^2$ is fixed is the key-arbor and projects out into a tube-like key-hole (see Fig. 2) in the casing X and has a square $C^4$ to receive a square mouth at the end of an ordinary barrel-key, like a clock-key. The chain C is merely a convenience to enable the key-hole to be placed at the side of the casing. By inserting his key the driver may set the disk B back until the zero-marks (seen in Fig. 5) coincide with the left-hand margin of aperture $C^4$, as seen in Fig. 1. When one hour has elapsed, the numerals 10, 20, 30, 40 on the several zones of disk B, indicating the fare for an hour's time, will have appeared at aperture $C^4$. After a lapse of two hours the second set of numerals 20, 40, 60, 80 will have appeared. Of course the numerals seen in Fig. 5 are arbitrary and are only intended to illustrate the working of the apparatus. The fare for the half-hours may be shown on the dial, as well as any less subdivision of time.

Every time the driver inserts his key in the key-hole he imprints a mark $y$ in Fig. 7 on the margin of strip Z. The mechanism whereby this is effected comprises a flat-pointed pin F on a lever F', fulcrumed at $F^2$, Fig. 2. The inner end of lever F' is provided with a spring, which takes under the bar $D^2$ and holds pin F down normally out of contact with strip Z. The outer end of lever F' is bent upward, and its rounded end $F^\times$ passes through a slot in the key-hole tube and bears elastically on the shaft $C^3$. When the key is inserted, its barrel displaces or pushes down the end $F^\times$ of the lever, and thus causes the point F (seen detached in Fig. 6) to rise and press on strip Z. Thus every time the driver inserts his key to set back disk B to zero—and he is required to do this at the beginning and end of every trip or engagement—he makes a mark $y$ on strip Z. This strip shows in Fig. 7 a record of the service of the carriage for about twelve hours. This record shows that the driver took in a passenger at about 7.20 o'clock, and at that time he set disk B back to zero, thus making a mark $y$. This drive lasted until 8.25, the mark $z$ being made by the seated passenger. At the end of this engagement the driver has again set the disk B to zero and made another mark $y$. At 8.45 two persons have engaged the carriage. At 10.15 they have left the carriage for twenty minutes, the driver waiting for them. They have again entered the carriage and driven until 11.35. At one o'clock the carriage was again engaged by two persons. At 1.25 a third person was taken in and all three rode until 2.45, when they alighted. At 3.30 a person engaged the carriage until 6.50, alighting twice during this time.

The space between the marks $y$ $y$ indicate the length of each engagement measured in time, and should the driver fail to insert his key and make these marks he may be charged for the extra time as if the carriage were engaged. If he turns back disk B too often or too soon, it indicates to the passenger a less sum than he should pay, and the driver may thus be the loser.

I employ manifold paper under the strip Z for convenience only. The pins D might be pencils or pens. In this case, however, they would require more care.

I have not attempted to show the manifold or carbon paper, as it is a common article of trade and its arrangement under the strip may be effected by any one. In effecting the attachment of the strip Z its overlapped ends may be gummed or pasted together when it is placed on the drum A. The strips Z will be specially printed and prepared, and sealing-gum may be applied to one end of same in their manufacture as it is applied to envelopes.

For the rubber bulbs $G^2$ and H' any equivalent elastic compressible vessel may be substituted, and I will say here that in applying my invention I take care to so house and protect all the parts that the driver cannot tamper with them in order to prevent their proper operation. This I have not attempted to show, as it forms no part of my present invention.

The strip Z may be of paper or of any thin material of the same character.

Weights may be substituted for springs in my apparatus as known equivalents, and the pins D and F need not be arranged below the drum A. They may as well be arranged above or at the side of same.

Having thus described my invention, I claim—

1. The combination, with a clock mechanism and a drum driven thereby, of a longitudinally-movable recording-pin arranged with its point adjacent to the periphery of said drum, a carriage-seat upheld by a spring, an elastic compressible vessel arranged under said seat, another similar vessel arranged under or behind said pin, and a tube connecting said vessels, said compressible vessels and connecting-tube being filled with liquid, substantially as set forth.

2. The combination, with a clock mechanism and a drum A, driven thereby, of a pointed pin D, mounted in a bearing in which it is capable of sliding longitudinally, the spring $D^3$, adapted to press the point of said pin against the periphery of said drum, and a stronger spring E, connected to said pin D, said spring E serving to hold the pin D normally out of contact with said drum, as set forth.

3. The combination, with a clock mechanism and a drum driven thereby, of the recording-pin and its springs, the carriage-seat and its supporting-spring, the compressible elastic bulb $G^2$, arranged in a recess under the seat, the compressible bulb H', arranged under or behind the retracting-spring of the registering-pin, the spring I, and the screw $I^2$, arranged between said bulb H' and said retracting-spring, substantially as set forth.

4. As a means for transmitting the movement of the carriage-seat to the recording mechanism, a spherical rubber bulb $G^2$, arranged in a recess under the seat, whereby lateral expansion is prevented, a flattened rubber bulb H', arranged in a recess under the recording mechanism, and a tube H, connecting said bulbs, said tube and bulbs being filled with a liquid, as set forth.

5. The combination, with the clock mechanism and a drum driven thereby, said drum being provided with a strip of paper or like material to receive the record, of the lever F' and its registering-pin F, the end $F^x$, of said lever projecting into the path of the disk-setting key, the disk B, frictionally mounted on its arbor, the key-arbor $C^3$, and means, substantially as described, connecting said winding-arbor with said disk, whereby, when the key is inserted to set said disk, a mark will be made on the strip on the drum.

6. The combination, with the clock mechanism having an arbor B', of the disk B, mounted frictionally on said arbor, the sheave C', fixed to the tubular shaft of said disk, the chain C, the sheave $C^2$, the key-arbor $C^3$, on which sheave $C^2$ is attached, the lever F', carrying the point F on its one end and its other end $F^x$ in the path of the setting-key, the said point F, and the drum A, driven by said clock mechanism, substantially as set forth.

In witness whereof I have hereunto signed my name in the presence of two subscribing witnesses.

CARL ADOLF ANDERSSON.

Witnesses:
NERE A. ELFWING,
ERNST SVANGVIST.